Figure 1:
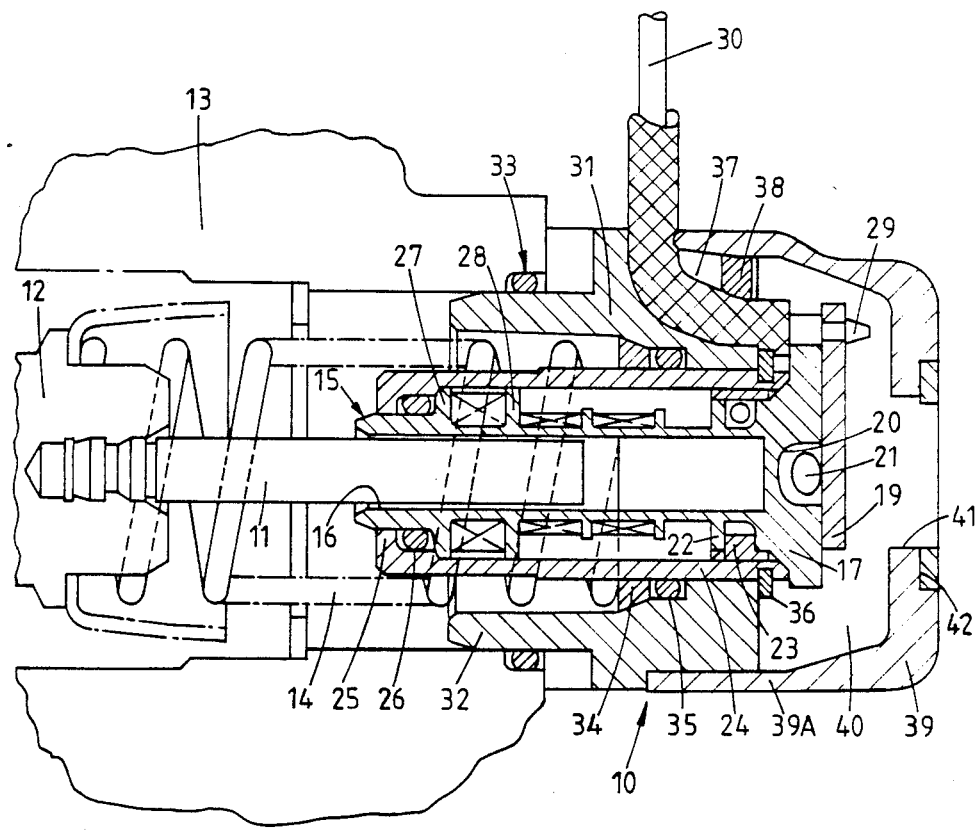

United States Patent [19]
Heathcote

[11] Patent Number: 4,833,352
[45] Date of Patent: May 23, 1989

[54] LINEAR INDUCTIVE TRANSDUCER

[75] Inventor: Geoffrey L. Heathcote, Tetbury, England

[73] Assignee: Lucas Industries Public Limited Company, Birmingham, England

[21] Appl. No.: 209,067

[22] Filed: Jun. 20, 1988

[30] Foreign Application Priority Data

Jun. 20, 1987 [GB] United Kingdom ............ 8714494

[51] Int. Cl.$^4$ ............................................. H02K 33/02
[52] U.S. Cl. ..................................... 310/15; 123/357; 335/255; 310/34
[58] Field of Search ............... 310/15, 17, 30, 34, 310/42, 43; 123/357; 417/417; 335/255, 256, 266, 268

[56] References Cited

U.S. PATENT DOCUMENTS

| 4,233,584 | 11/1980 | Füssner | 335/260 |
| 4,270,502 | 6/1981 | Seilly | 310/27 |
| 4,453,124 | 6/1984 | Francis et al. | 323/369 |

FOREIGN PATENT DOCUMENTS 2121182 12/1983 United Kingdom .

Primary Examiner—Peter S. Wong
Assistant Examiner—Judson H. Jones
Attorney, Agent, or Firm—Balough, Osann, Kramer, Dvorak, Genova & Traub

[57] ABSTRACT

A linear inductive transducer includes a cylindrical former about which is wound a winding. Surrounding the former is a magnetic sleeve having external flange means which is located against an end face of a first casing part. A core member is slidable within a bore in the former and the former has a head located against an end of the sleeve. A second casing part is located about the first casing part and defines a space in which the head is located. The space is filled with a synthetic resin which secures the casing parts together and retains the head in engagement with the sleeve and the flange means in engagement with the first casing part.

8 Claims, 2 Drawing Sheets

LINEAR INDUCTIVE TRANSDUCER

This invention relates to a linear inductive transducer of the kind comprising a cylindrical former formed from non magnetic material and defining a bore in which is located a slidable magnetic core member, the former carrying a plurality of windings the inductance of which is varied upon movement of the core.

A transducer of the aforesaid type together with an external electrical circuit for interrogating the transducer is described in British Patent No. 2121182B.

The object of the present invention is to provide a convenient construction of the transducer.

According to the invention a linear inductive transducer comprises a cylindrical former formed from non-magnetic material, a blind bore extending inwardly from one end of the former, a magnetic core member slidable in the bore, an electrical winding wound about the former, an annular magnetic sleeve surrounding the former and the winding thereon, said sleeve having an inwardly directed flange which extends towards the former adjacent said one end thereof, and an enlarged heat at the opposite end of the former, characterised in that said magnetic sleeve is provided with flange means for engagement with an end surface of a first moulded casing part, the sleeve being located in a bore formed in the casing part, the end surface of the sleeve remote from said one end thereof being bevelled and said enlarged head defining a complementary surface for engagement by said end surface of the sleeve, a second moulded casing part engageable about a portion of said first casing part and defining a space therewith, said enlarged head being located in said space, and a filling formed from synthetic resin material in said space, said filling acting to retain said flange means in engagement with said end wall of the first casing part, the enlarged head in engagement with the sleeve and acting to secure said casing parts together.

Figure 2:
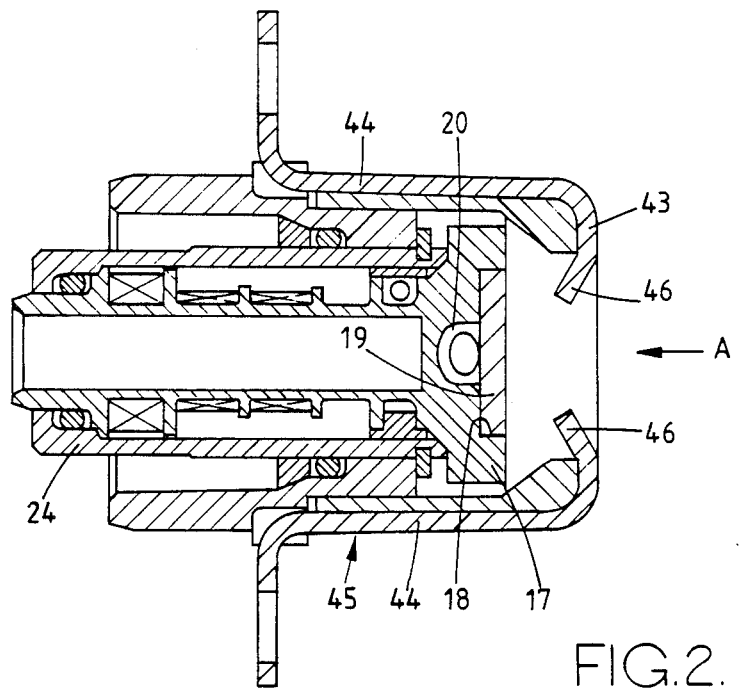
Figure 3:
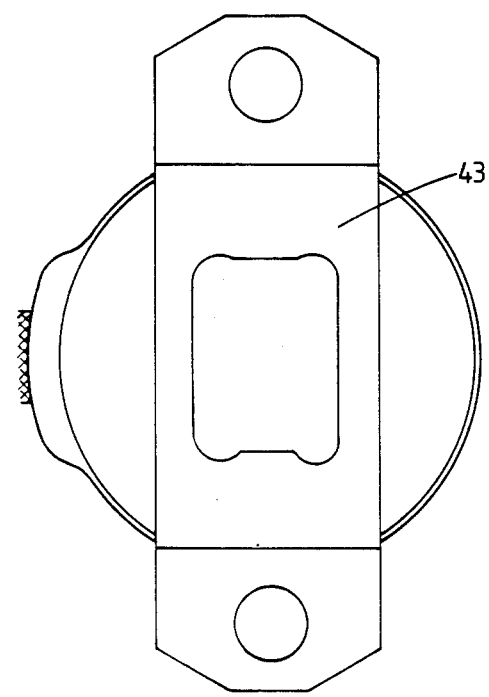

In the accompanying drawings:

FIG. 1 is a sectional side elevation of the transducer showing also its mounting in a fuel injection pump, FIG. 2 is a sectional side elevation of the transducer taken at right angles to FIG. 1, and FIG. 3 is an end view in the direction of the arrow A of FIG. 2.

Referring to the drawings the transducer includes a stator assembly 10 in which is slidable a magnetic core member 11 the latter as shown in FIG. 1, being coupled to a movable component 12 mounted in a housing 13. In the example the component 12 is a piston forming part of a fuel injection pumping apparatus for supplying fuel to an internal combustion engine. The piston is biased by a coiled compression spring 14 one end of which engages the piston and the other end of which engages part of the stator assembly 10 which is retained in an opening in the housing 13 of the apparatus.

The stator assembly 10 comprises an elongated cylindrical former 15 formed from synthetic resin material. Within the former there is defined a blind bore 16 slightly larger in diameter than the core member and which extends from the one end of the former which is in use, presented to the piston. The other end of the former is provided with an enlarged head 17 which closes the adjacent end of the bore 16. The end face of the head is provided with a transverse slot 18 to receive a printed circuit board 19 and an elongated recess 20 is formed in the base of the slot to receive the body of a thermistor 21.

The outer peripheral surface of the former defines a plurality of circumferential ribs the first 22 of which is spaced from the head by a small distance and which together with a radial face on the head forms a slot in which is located a plurality of angularly spaced inwardly extending tongues formed on a retaining band 23. Also provided is a tubular magnetic sleeve 24 which at its end adjacent the head 17 has an oblique surface engaging with a complementary surface on the head. At its opposite end the sleeve is formed with an inwardly extending flange 25 which locates about the former adjacent the one end thereof. A sealing ring 26 is trapped between the sleeve and the former, the sealing ring being retained in position during assembly of the sleeve and the former by means of a rib 27 on the former.

A further rib 28 is provided on the former at a position spaced from the rib 27 in the direction of the head. The ribs 27 and 28 have a diameter slightly smaller than the internal diameter of the sleeve and define between them a groove in which is wound part of a winding the remaining part of parts of the winding being located in a shallower groove or grooves defined by a further rib or ribs on the former. The parts of the winding are connected in series and the number of turns in each part of the winding is chosen as described in the aforementioned Patent Specification to provide the required linearity of output.

The two ends of the interconnected parts of the winding are soldered to pins (not shown) respectively which extend through the head 17 and are soldered to conductors on the printed circuit board 19 and to one of the conductors and to a further conductor on the board, are connected the terminals of the thermistor 21. The conductors extend to three connectors 29 only one of which is shown, to which are connected cables 30 by which the windings and thermistor are connected to the external interrogation circuit. The retaining band 23 acts to locate the ends of the winding to prevent them engaging the sleeve 24.

The former assembly also includes a first moulded casing part 31 which includes a tubular portion 32 which in use, is located within the opening in the housing of the pumping apparatus, a seal ring 33 being provided to form a fuel tight seal. The inner surface of the tubular portion defines with the sleeve 25 an annular space to accommodate the spring 14 and at the end of the space adjacent an inwardly inclined shoulder defined on the casing part, is an abutment ring 34 for the spring. Conveniently the abutment ring is provided with a plurality of retaining elements which act to retain the ring in position. The ring 34 also acts to locate a seal ring 35. The seal rings 26 and 35 prevent any fuel present within the housing of the apparatus from gaining access to the winding. Beyond the pocket for the seal ring the casing part locates about the sleeve 24 and its axial location is determined by a split ring 36 which is located within a groove formed in the sleeve 24.

The casing part 31 defines a groove 37 to receive the cables 30 and the cables are retained in the groove by means of an insert 38 which is located in a pair of radial slots defined in the opposite walls of the groove 37. The insert has an outer surface which corresponds to the outer surface of the casing part 31 and a shaped inner surface which engages the protective covering of the cables.

The stator assembly includes a second moulded casing part 39 which is of generally cup-shaped form. The part 39 has a skirt portion 39A which is positioned about the casing part 31 and defines a space 40. The skirt portion 39 is shaped at one angular position to allow the cable to exit from the groove 37 and to retain the insert 38 in position so that the cables are gripped. The casing part 39 also defines internal projections (not shown), for engagement with the printed circuit board.

As will be seen from the drawings the base wall of the casing part 39 is provided with a rectangular aperture 41 and extending across the outer face of the base wall is a groove 42 which extends in both directions along the side wall. The groove accommodates the base and side portions 43, 44 of a top hat section support bracket 45, the outwardly extending wings of the bracket defining apertures for the reception of screws to retain the assembly relative to the pumping apparatus. The base portion 43 of the bracket is cut to define a pair of tangs 46 which extend through the aperture 41 into the space 40. When assembly of the various parts so far described has been completed, the space 40 is filled with an epoxy resin material which when hardened, keys the bracket to the casing part 39 and also as shown in FIG. 2, secures the former 15 within the part 39.

Prior to filling the space 40 the casing parts 31 and 39 are positively held relative to each other, this having the effect of pushing the oblique surface of the head 17 into engagement with the complementary surface of the sleeve 24 and in turn pushing the split ring 36 into firm engagement with the casing part 31. Moreover, a slight clearance exits between the skirt portion 39A of the casing part 39 and the casing part 31. The resin which flows along this clearance will "freeze" therein to form a seal to prevent escape of the main volume of the resin and will secure the two casing parts together.

I claim:

1. A linear transducer comprising a cylindrical former formed from non-magnetic material, a blind bore extending inwardly from one end of the former, a magnetic core member slidable in the bore, an electrical winding wound about the former, an annular magnetic sleeve surrounding the former and the winding thereon, said sleeve having an inwardly directed flange which extends towards the former adjacent said one end thereof, and an enlarged head at the opposite end of the former, characterised in that said magnetic sleeve is provided with flange means for engagement with an end surface of a first moulded casing part, the sleeve being located in a bore formed in the casing part, the end surface of the sleeve remote from said one end thereof being bevelled and said enlarged head defining a complementary surface for engagement by said end surface of the sleeve, a second moulded casing part engageable about a portion of said first casing part and defining a space therewith, said enlarged head being located in said space, and a filling formed from synthetic resin material in said space, said filling acting to retain said flange means in engagement with said end wall of the first casing part, the enlarged head in engagement with the sleeve and acting to secure said casing parts together.

2. A transducer according to claim 1 characterised in that said second casing part defines a skirt portion which surrounds a portion of said first casing part, a limited clearance being defined therebetween, the synthetic resin material flowing within said clearance to secure said parts together.

3. A transducer according to claim 1 characterised in that said first casing part defines a slot along which extends a connecting cable, and by an insert which is engaged with said connecting cable to retain the cable against the base of said slot, said insert being retained in position by part of a skirt portion of the second casing part.

4. A transducer according to claim 3 characterised by a printed circuit board which is located against said enlarged head, the board carrying circuit elements for effecting an electrical connection between said winding and said cable and to a thermistor which is mounted within a recess formed in the head.

5. A transducer according to claim 1 characterised by a first seal ring mounted about the former and interposed between said flange on the sleeve and a rib on the outer peripheral surface of the former, and a second seal ring mounted about the sleeve member and forming a seal between the sleeve member and said first casing part.

6. A transducer according to claim 1 characterised in that said first casing part is provided with a tubular portion which extends with clearance about said sleeve, and an abutment ring located within said clearance, said abutment ring in use, forming an abutment for a spring which biases a component to which the core member is coupled.

7. A transducer according to claim 1 characterised in that said flange means comprises a split ring which is located in a groove formed in said sleeve.

8. A transducer according to claim 1 characterised by an aperture in said second casing part and a support bracket defining a pair of tangs which extend through the opening into said space, said tangs being embedded in said synthetic resin filling to retain the support bracket relative to the second casing part.

* * * * *